US011531555B2

(12) United States Patent
Noorshams et al.

(10) Patent No.: US 11,531,555 B2
(45) Date of Patent: Dec. 20, 2022

(54) SELECTIVE PRUNING OF A SYSTEM CONFIGURATION MODEL FOR SYSTEM RECONFIGURATIONS

(71) Applicant: INTERNATIONAL BUSINESS MACHINES CORPORATION, Armonk, NY (US)

(72) Inventors: Qais Noorshams, Frankfurt (DE); Norman Christopher Böwing, Böblingen (DE); Simon Spinner, Stuttgart (DE); Jason Matthew Stapels, Clymer, NY (US)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 17/214,177

(22) Filed: Mar. 26, 2021

(65) Prior Publication Data
US 2022/0308896 A1 Sep. 29, 2022

(51) Int. Cl.
*G06F 9/445* (2018.01)
*G06F 16/16* (2019.01)
(52) U.S. Cl.
CPC .......... *G06F 9/44505* (2013.01); *G06F 16/16* (2019.01)
(58) Field of Classification Search
CPC ............................. G06F 9/44505; G06F 16/16
See application file for complete search history.

(56) References Cited

U.S. PATENT DOCUMENTS 5,220,654 A 6/1993 Benson
5,257,368 A 10/1993 Benson
(Continued)

FOREIGN PATENT DOCUMENTS

CN 110321164 A 10/2019
WO WO-2014019649 A1 * 2/2014 ............. G06Q 10/02

OTHER PUBLICATIONS

International Search Report and Written Opinion of International Application No. PCT/CN2022/083054, dated May 20, 2022, 10 pages.

(Continued)

*Primary Examiner* — Henry Tsai
*Assistant Examiner* — John B Roche
(74) *Attorney, Agent, or Firm* — Anthony M. Pallone

(57) ABSTRACT

An embodiment of the invention may include a method, computer program product, and computer system for reconfiguration of a computing environment from an as-is input/output (I/O) configuration to a to-be I/O configuration. An embodiment may include normalizing respective hierarchical models of the as-is and the to-be I/O configurations. The hierarchical models each comprise a hierarchical structure of leaf and non-leaf nodes. Normalizing comprises the application of syntactical transformation rules to the hierarchical models such that their respective I/O configurations are defined in a syntactically consistent manner. An embodiment may include creating respective hash tree representations of the first hierarchical model and the second hierarchical model. Nodes of the hash tree representations are checksum values. Nodes of the hash tree representations reflect the hierarchical structure of their respective hierarchical models. An embodiment may include pruning one or more nodes of the hash tree representations.

20 Claims, 16 Drawing Sheets

(56) References Cited

U.S. PATENT DOCUMENTS

| | | | |
|---|---|---|---|
| 6,412,092 B1 | 6/2002 | Raghunath | |
| 7,415,653 B1 | 8/2008 | Bonwick | |
| 8,069,373 B2 | 11/2011 | Vorbach | |
| 8,086,706 B2 | 12/2011 | Schlansker | |
| 9,063,664 B1 | 6/2015 | Li | |
| 10,191,736 B2 | 1/2019 | Ari | |
| 11,443,164 B2* | 9/2022 | Dalli | G16H 50/20 |
| 2008/0154577 A1* | 6/2008 | Kim | G06F 40/45 |
| | | | 704/5 |
| 2009/0150725 A1 | 6/2009 | Vorbach | |
| 2009/0228494 A1 | 9/2009 | Beichter | |
| 2010/0138522 A1 | 6/2010 | Beichter | |
| 2011/0173306 A1 | 7/2011 | Schlansker | |
| 2018/0089073 A1 | 3/2018 | Gomes | |
| 2018/0314518 A1 | 11/2018 | Ari | |
| 2019/0303159 A1 | 10/2019 | Fryman | |
| 2022/0198254 A1* | 6/2022 | Dalli | G06N 3/0445 |

OTHER PUBLICATIONS

Noorshams et al., "Selective Pruning of a System Configuration Model for System Reconfigurations," International Application No. PCT/CN2022/083054, Filed Mar. 25, 2022, 55 pages.

Author Unknown, "Recovery of lost synchronization between Hardware System Area (HSA) and the active I/O configuration," IBM, Updated Mar. 3, 2021, https://www.ibm.com/docs/en/zos/2.3.0?topic=crs-recovery-lost-synchronization-between-hardware-system-area-hsa-active-io-configuration, 4 pages.

* cited by examiner

```
{
  "token": {
  "name": "OSA2PART",
  "qualifier": "",
  "timestamp": "2019-05-28T13:20:50.52Z"
  },
  "channelAdapters": [
  { "id": 190, "type": "OSD"},
  ],
  "controlUnits": [
  { "number": 63488,
    "devices": [
      "90": { "number": 590,
    ]
  },
  "channelSubsystems": [
  { "id": 0,
    "partitions": [
      { "id": 1, "nannamee":
      { "id": 2, "": "LPRIGHT"
    ],
    "subchannelSets": [
    { "id": 0,
      "subchannels": [
        "devices": "63488
        "partitions": [ 1
      ]
    },
    ],
    "channelPaths": [
    { "id": 248,
      "adapter": 190,
      "controlUnits": [
        { "number": 63488 )
      ],
      "partitions": [{ "id": 1 }, { "id": 2 }]
  }
```

```json
"channelSubsystems": [
  {
    "id": 0,
    "partitions": [
      { "id": 1, "name": "LPLEFT" },
      { "id": 2, "name": "LPRIGHT" }
    ],
    "subchannelSets": [
      {
        "id": 0,
        "subchannels": [
          {
            "devices": "63488.90",
            "partitions": [ 1, 2]
          }
        ]
      }
    ]
  }
]
```

SELECTIVE PRUNING OF A SYSTEM CONFIGURATION MODEL FOR SYSTEM RECONFIGURATIONS

BACKGROUND

One or more aspects relate, in general, to facilitating processing within a computing environment, and in particular, to comparing system input/output (I/O) configurations of the computing environment in response to a system I/O reconfiguration of the hardware and software of the computing environment to facilitate processing within the computing environment.

Configuration of a computing environment includes defining and activating various hardware and software components of the computing environment, including, but not limited to, logical partitions, input/output (I/O) configurations, operating systems, etc. The I/O configuration is the definition of the hardware and software components of the computing environment which is hierarchically structured. Products may be used to facilitate such configuration definition. For example, the Hardware Configuration Definition (HCD) product, offered by International Business Machines Corporation, Armonk, N.Y., is used to define and activate the I/O configuration.

The Hardware Configuration Definition product provides a panel-driven interface that enables the definition of elements, such as I/O devices, and connects them to logical partitions and operating systems for their use. The Hardware Configuration Definition product and other such products may also be used in reconfiguring the computing environment once configured.

Currently, when I/O elements within a defined existing I/O configuration are reconfigured, the desired I/O configuration needs to be compared with the existing I/O configuration before the desired I/O configuration can be applied to the computing environment. However, the process of comparing a desired I/O configuration with an existing I/O configuration, in order to identify changes, is typically computationally expensive and resource intensive, especially when performed within a resource-constrained environment as part of the computing environment firmware. The issues associated with this process are further exacerbated as the complexity and size of I/O configurations increase.

BRIEF SUMMARY

Shortcomings of the prior art are overcome, and additional advantages are provided through embodiments of the invention. An embodiment of the invention may include a method, computer program product, and computer system for reconfiguration of a computing environment from an as-is input/output (I/O) configuration to a to-be I/O configuration. An embodiment may include normalizing a first hierarchical model of the as-is I/O configuration and a second hierarchical model of the to-be I/O configuration. The first and the second hierarchical model each comprise a hierarchical structure of leaf and non-leaf nodes. Normalizing comprises the application of syntactical transformation rules to the first and the second hierarchical models such that their respective I/O configurations are defined in a syntactically consistent manner across the first and the second hierarchical models. An embodiment may include creating a first hash tree representation of the first hierarchical model and a second hash tree representation of the second hierarchical model. Nodes of the first hash tree representation are checksum values calculated for leaf and non-leaf nodes of the first hierarchical model. Nodes of the second hash tree representation are checksum values calculated for leaf and non-leaf nodes of the second hierarchical model. Nodes of the first and second hash tree representations reflect the hierarchical structure of the first and the second hierarchical models, respectively. An embodiment may include pruning one or more nodes of the first hash tree representation and the second hash tree representation where checksum values are equal up to a root node of the first hash tree representation and a root node of the second hash tree representation.

The proposed method, computer program product, and computer system for reconfiguration of a computing environment from an as-is input/output (I/O) configuration to a to-be I/O configuration offers multiple advantages and technical effects. For example, computing environment resources not used by internal processes (e.g., I/O configuration comparison) may be freed and made available to users of the computing environment. Computing environment memory of sub-trees with equal checksum values may be safely freed. Additionally, less network traffic of the computing environment results as the size of an I/O reconfiguration request is reduced. Furthermore, faster comparison of I/O configurations is achieved as comparisons for sub-nodes (e.g., I/O sub-elements) of equal parent nodes are not necessary.

In the following, additional embodiments of the inventive concept—applicable to the method, computer program product, and computer system—will be described.

According to an advantageous embodiment, the as-is I/O configuration is defined by an as-is input/output definition file (IODF), and the to-be I/O configuration is defined by a to-be IODF. Both the as-is IODF and the to-be IODF comprise a binary data structure similar to a relational database with tables and cross-references.

According to an advantageous embodiment, the first hierarchical model and the second hierarchical model are based on the as-is IODF and the to-be IODF, respectively. Where a hierarchical model is a text-based JavaScript object notation (JSON) data structure comprising hierarchically nested leaf nodes and non-leaf nodes with one or more cross-references between them. Where the leaf nodes and non-leaf nodes are representative of I/O elements of an IODF. Deriving the hierarchical model comprises iteratively parsing the IODF to collect the I/O elements contained therein, including their properties; combining the I/O elements in a domain model defined by Java classes; and serializing the domain model into a JSON data structure.

According to an advantageous embodiment, leaf and non-leaf nodes of the first hierarchical model are representative of I/O elements within the as-is I/O configuration. Leaf and non-leaf nodes of the second hierarchical model are representative of I/O elements within the to-be I/O configuration. The syntactical transformation rules are specific to each I/O element within an I/O configuration and may need to be applied in a specific order.

According to an advantageous embodiment, the method, computer program product, and computer system may further include pruning one or more nodes of the second hash tree representation where checksum values are the same between the first hash tree representation and the second hash tree representation.

According to an advantageous embodiment, the method, computer program product, and computer system may further include persisting the first hash tree representation of the first hierarchical model and the second hash tree representation of the second hierarchical model within a memory of the computing environment.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 6 depicts a resulting JavaScript object notation hierarchical model 600 derived from an input/output, definition file, in accordance with one or more aspects of the present invention;

FIG. 12 depicts a logical view of an I/O configuration along with a JSON hierarchical model of the I/O configuration, in accordance with an aspect of the present invention;

DETAILED DESCRIPTION

Figure 1A:
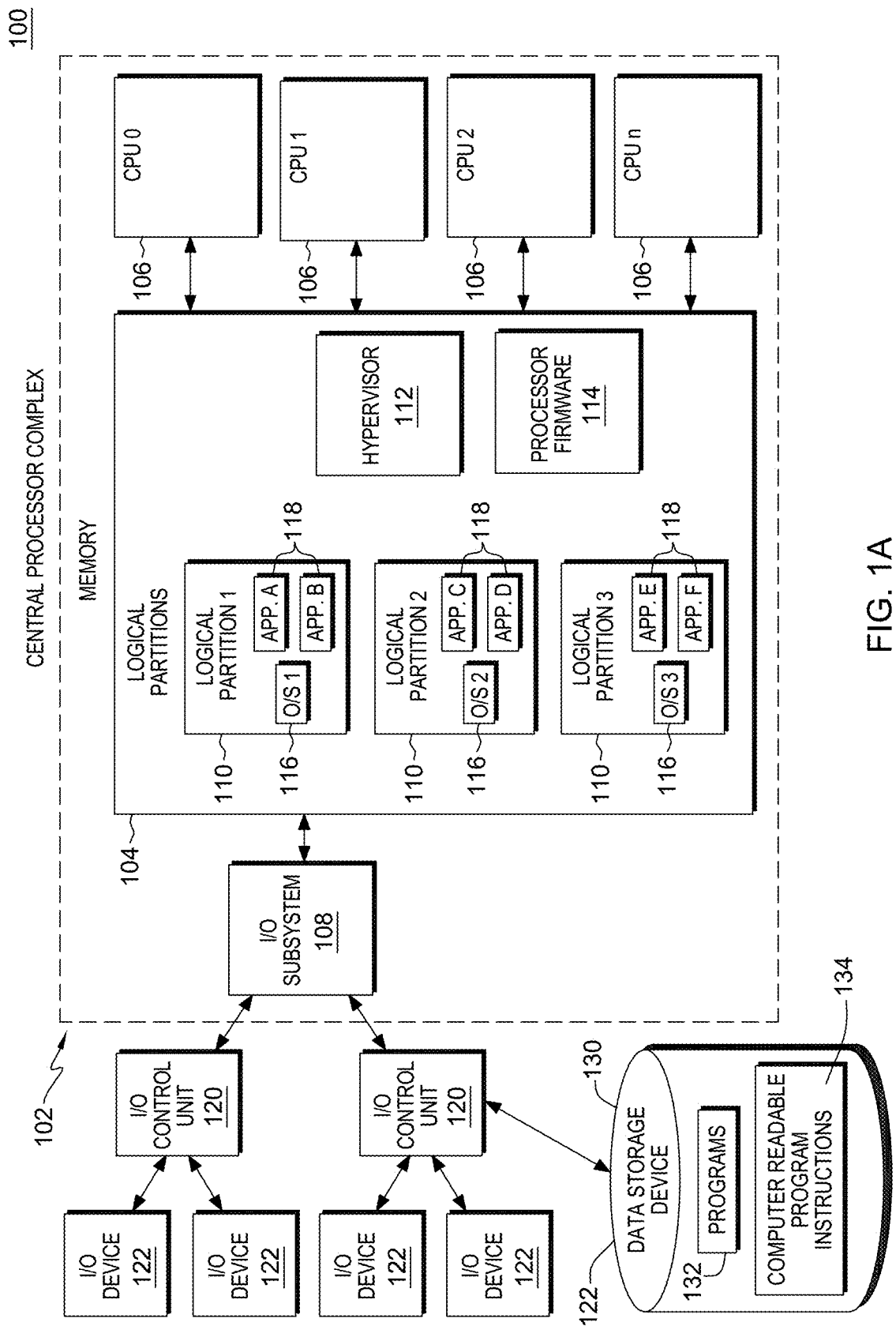
FIG. 1A depicts one example of a computing environment to incorporate and use one or more aspects of the present invention.

An input/output (I/O) configuration is the definition of the set of hardware and software resources available to an operating system of a hierarchically structured computing environment, and the connections between these resources.

In defining an I/O configuration, both the physical (e.g., type, model) and logical (e.g., assigned device identifier) information about the hardware and software resources are provided. For example, when defining an I/O configuration one may specify one or more of the following elements for the computing environment: operating systems; eligible device tables (EDTs) with esoteric device groups; processor(s); logical channel subsystems; PCIe functions; partitions; channel paths on the processor(s); switches attached to the channel paths; control units attached to channel paths or switches; and I/O devices in one or more subchannel sets and connected to the control units.

As mentioned above, when I/O elements within a defined configuration are reconfigured, the desired (to-be) configuration needs to be analyzed and compared with the existing baseline (as-is) configuration before the desired configuration can be activated within the computing environment. As complexity of a computing environment increases, the corresponding I/O configuration definition can become large (e.g., hundreds of MB). As such, current techniques for I/O configuration definition analysis and comparison (i.e., I/O reconfiguration), which requires the parsing of all I/O elements within a configuration definition and looping through them to identify relationships, is computationally expensive and resource intensive (i.e., requiring processor and memory utilization within the computing environment, creating network traffic). This issue becomes increasingly time consuming and disadvantageous for the computing system given that I/O configuration comparison is typically executed within a resource-constrained environment as part of the computing system firmware.

As an illustration, consider an enterprise scenario in which a reconfiguration consisting of a small amount of incremental I/O configuration changes, as represented by a to-be I/O configuration definition, are proposed to a large as-is I/O configuration definition. In such a scenario, before the to-be I/O configuration definition can be implemented (i.e., activated) within the computing environment, the to-be I/O configuration must be compared with the as-is I/O configuration in order to identify the changes resulting from the reconfiguration. Consequently, a significant amount of processing time is spent by the computing environment analyzing and comparing the I/O configurations despite there being only a small amount of actions required (i.e., the small amount of incremental I/O configuration changes). Moreover, in performing the comparison between the to-be I/O configuration and the as-is I/O configuration, unnecessary information (e.g., complete models of the as-is I/O configuration and the corresponding to-be I/O configuration which are largely similar and reflect only a small amount of incremental configuration changes, portions of the as-is I/O configuration and the to-be I/O configuration which are the same) are stored within memory of the computing environment, thus utilizing valuable storage space. Furthermore, both I/O configurations (the as-is and the to-be) need to be sent over an internal network of the computing environment to be activated, thus creating a significant amount of network traffic.

In response to the above issues associated with current techniques for I/O configuration definition comparison resulting from I/O reconfiguration, embodiments of the present invention propose a novel and advantageous approach to implement I/O reconfigurations by comparing two I/O configuration definitions (e.g., an as-is and a to-be I/O configuration) side-by-side and selectively pruning (i.e., deleting) elements of one or more of the two I/O configuration definitions, thereby improving resource consumption and execution time within a computing environment. More specifically, the novel and advantageous approach, as disclosed through embodiments of the present invention, includes: creating a hierarchal model of each I/O configuration definition for easier comparison; processing the I/O configurations iteratively without the need to keep the complete model for each configuration in memory; utilizing a checksum mechanism for faster determination of differences between the two I/O configurations; and selectively pruning, based on checksum values, one or more of the I/O configurations prior to sending them over an internal network of the computing environment for activation.

One or more aspects of the present invention relate to system reconfiguration, such as dynamic hardware reconfiguration within a computing environment. Dynamic hardware reconfiguration enables hardware and software components of a computing environment, such as logical partitions, control units, input/output (I/O) devices, operating systems, etc., to be reconfigured without requiring an initial program load (IPL) or a power on reset (POR).

One embodiment of a computing environment to incorporate and use one or more aspects of the present invention is described with reference to FIG. 1A. In one example, the computing environment is based on the z/Architecture® hardware architecture, an example of which is described in a publication entitled, "z/Architecture Principles of Operation," IBM Publication No. SA22-7832-12, 13$^{th}$ edition, September 2019. The z/Architecture hardware architecture, however, is only one example architecture; other architectures and/or other types of computing environments which utilize stored I/O configuration definitions may include and/or use one or more aspects of the present invention.

In one example, a computing environment 100 includes a central processor complex 102, an example of which is an IBM Z® central processor complex, that includes one or more IBM z15™ systems, as a particular example. Other central processor complexes, and/or other systems based on the same or other hardware architectures may also incorporate and use one or more aspects of the present invention. IBM, z/Architecture, IBM Z, and IBM z15 are trademarks or registered trademarks of International Business Machines Corporation in at least one jurisdiction. As an example, central processor complex 102 includes, for instance, a memory 104 (a.k.a., system memory, main memory, main storage, central storage, storage) coupled to one or more processors (a.k.a., central processing units (CPUs)) 106, and to an input/output subsystem 108, each of which is described further below.

Memory 104 includes, for example, one or more logical partitions 110, a hypervisor 112 that manages the logical partitions, and processor firmware 114. One example of hypervisor 112 is the Processor Resource/System Manager (PR/SM™) hypervisor, offered by International Business Machines Corporation, Armonk, N.Y. As used herein, firmware includes, e.g., the microcode of the processor. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware. PR/SM is a trademark or registered trademark of International Business Machines Corporation in at least one jurisdiction.

Each logical partition 110 is capable of running an operating system (e.g., O/S 1-O/S 3) 116, such as a z/OS operating system, or another operating system, and operating with different programs (e.g., App. A-App. F) 118. z/OS is a trademark or registered trademark of International Business Machines Corporation in at least one jurisdiction.

Memory 104 is coupled to processors (e.g., CPU 0-CPU n) 106, which are physical processor resources that may be allocated to the logical partitions. For instance, a logical partition 110 includes one or more logical processors, each of which represents all or a share of a physical processor resource 106 that may be dynamically allocated to the logical partition.

Further, memory 104 is coupled to I/O subsystem 108. I/O subsystem 108 may be a part of the central processor complex or separate therefrom. It directs the flow of information between main storage 104 and input/output control units 120 and/or input/output (I/O) devices 122 coupled to the central processor complex.

Many types of I/O devices 122 may be used. One particular type is a data storage device 130. Data storage device 130 may store one or more programs 132, one or more computer readable program instructions 134, and/or data, etc. The computer readable program instructions may be configured to carry out functions of embodiments of aspects of the invention.

Central processor complex 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central processor complex 102. Examples include, but are not limited to: microcode, device drivers, redundant processing units, external disk drive arrays, RAID systems, tape drives, and data archival storage systems, etc.

Moreover, central processor complex 102 may be operational with numerous other general-purpose or special purpose computing system environments or configurations. Examples of well-known computing systems, environments, and/or configurations that may be suitable for use with central processor complex 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
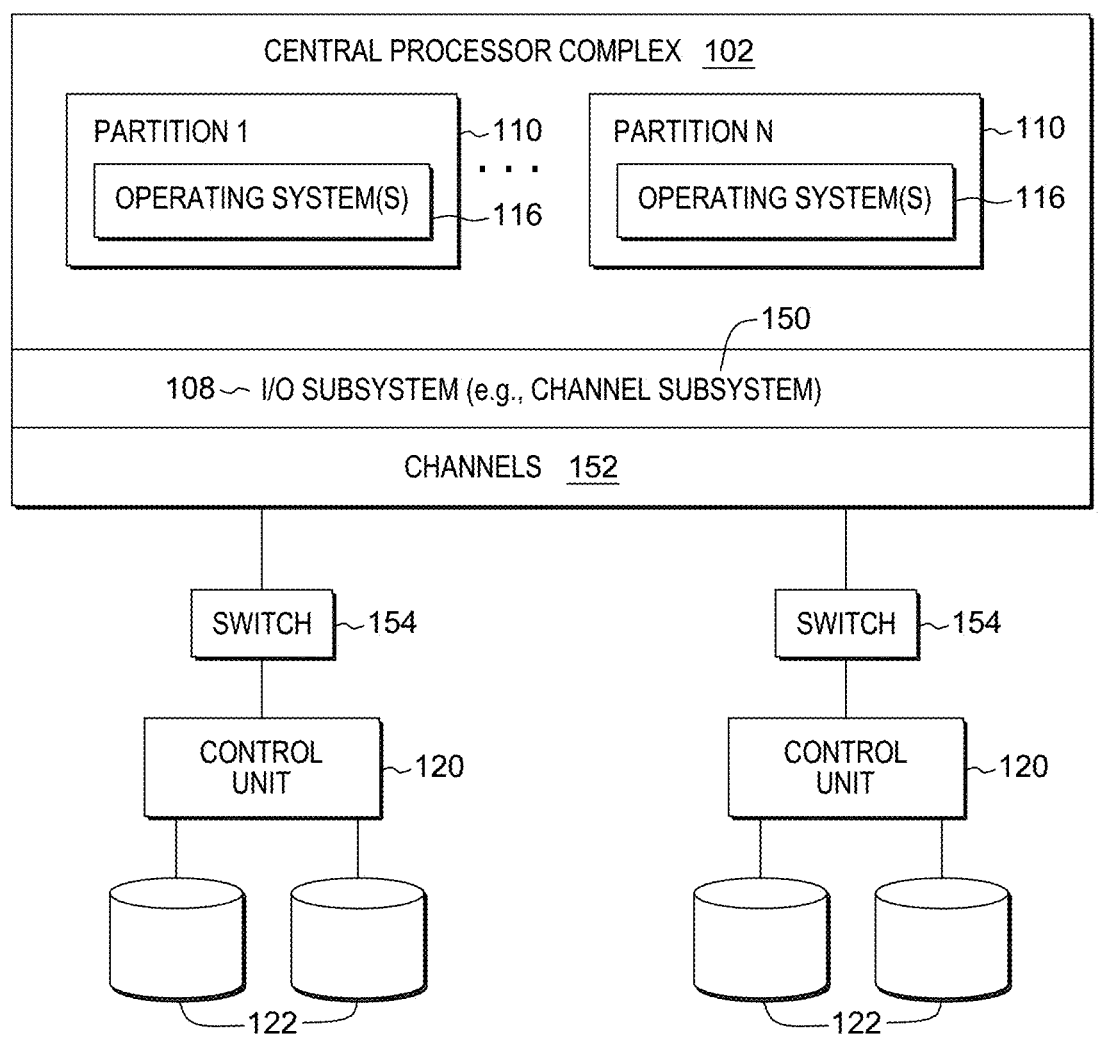
FIG. 1B depicts one example of further details of the computing environment of FIG. 1A, in accordance with one or more aspects of the present invention.

Further details regarding one embodiment of a computing environment, such as computing environment 100, are described with reference to FIG. 1B. In one embodiment, input/output (I/O) subsystem 108 is a channel subsystem 150 which receives commands in channel programs from one or more operating systems (e.g., operating system 116). A channel program includes one or more channel command words (CCWs), and each channel command word includes a command (e.g., read, write, control) and a data address for use in data communication. The channel subsystem forwards the commands, via, e.g., channels 152, to one or more communication components of the computing environment, such as to one or more switches 154, which are coupled, in one example, to one or more control units 120. The one or more control units are coupled to one or more I/O devices 122. The one or more switches obtain the requested information, based on the commands, from, e.g., one or more I/O devices 122, and return results back to the operating system(s).

In accordance with one or more aspects, a computing environment, such as computing environment 100, may be dynamically reconfigured by, for instance, adding, modifying, and/or deleting one or more I/O elements such as logical partitions, one or more control units, and/or one or more devices, as examples. To perform hardware reconfiguration, in one example, a hardware configuration definition is used, as described with reference to FIG. 2.

Figure 2:
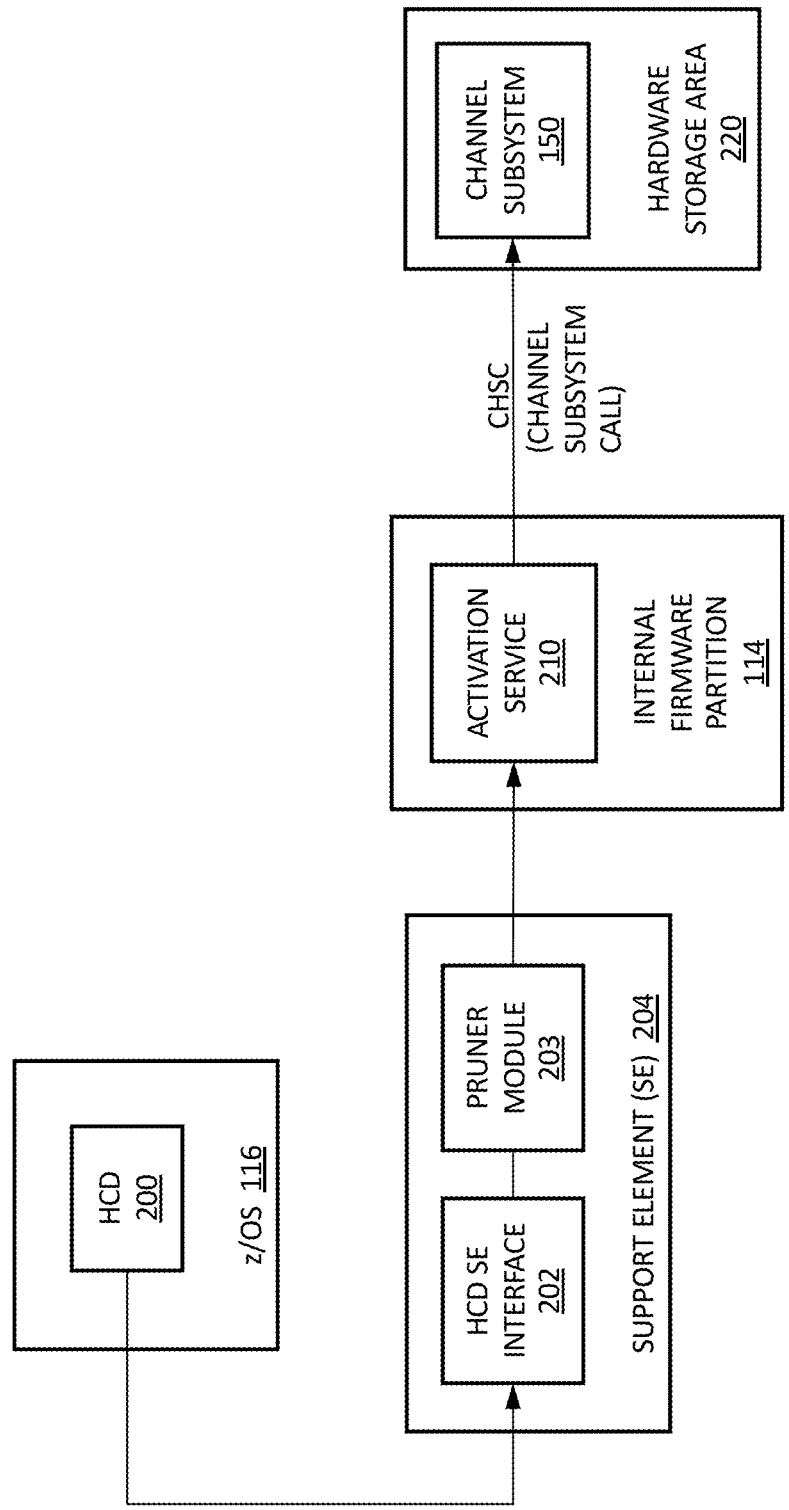
FIG. 2 depicts one example of using a pruner module to reconfigure a hardware configuration, in accordance with one or more aspects of the present invention.
Figure 3:
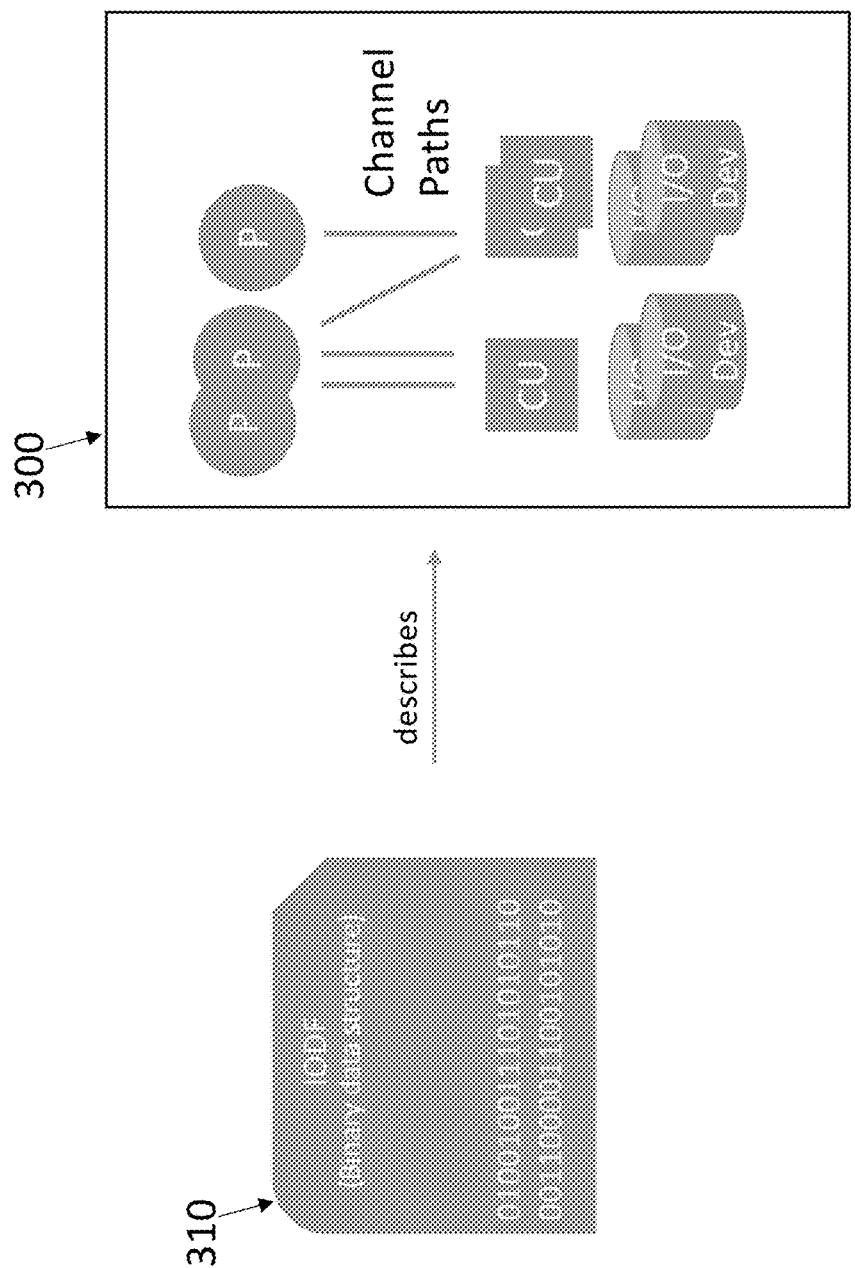
FIG. 3 depicts an input/output definition file 310 of a computing environment 300, in accordance with one or more aspects of the present invention.

As shown in FIG. 2, in one example, a Hardware Configuration Definition (HCD) product 200, runs on an operating system, such as operating system 116 (e.g., z/OS operating system). Hardware Configuration Definition product 200 is used to define and activate I/O configurations of one or more servers (e.g., IBM Z Servers) of the computing environment (e.g., computing environment 100) and its operating systems. For example, Hardware Configuration Definition product 200 enables the definition of elements, such as I/O devices from storage systems, and to connect them to the partitions and operating systems for their use over a series of other I/O elements. A configuration which defines the I/O elements may be stored in a binary data structure. For example, the output of Hardware Configuration Definition product 200 is an input/output definition file (IODF) which contains both hardware and software configuration data of the computing environment (e.g., computing environment 100). An IODF may be represented as a binary data structure, similar to a relational database with tables and cross references, optimized for memory usage and may define multiple hardware and software configurations to an operating system. For example, an IODF may contain information about an I/O configuration, such as operating system data, switch data, device data, processor data, partition data, channel path data, control unit data, and channel subsystem data. As an illustration, FIG. 3 depicts an IODF 310 of a logically represented computing environment 300. IODF 310 describes/defines the allocation of partitions (P) among multiple control units (CU) and I/O devices (I/O Dev) via separate channel paths. When Hardware Configuration Definition product 200 activates an IODF (e.g., IODF 310), it defines the I/O configuration to a channel subsystem or the operation system, or both.

Figure 4:
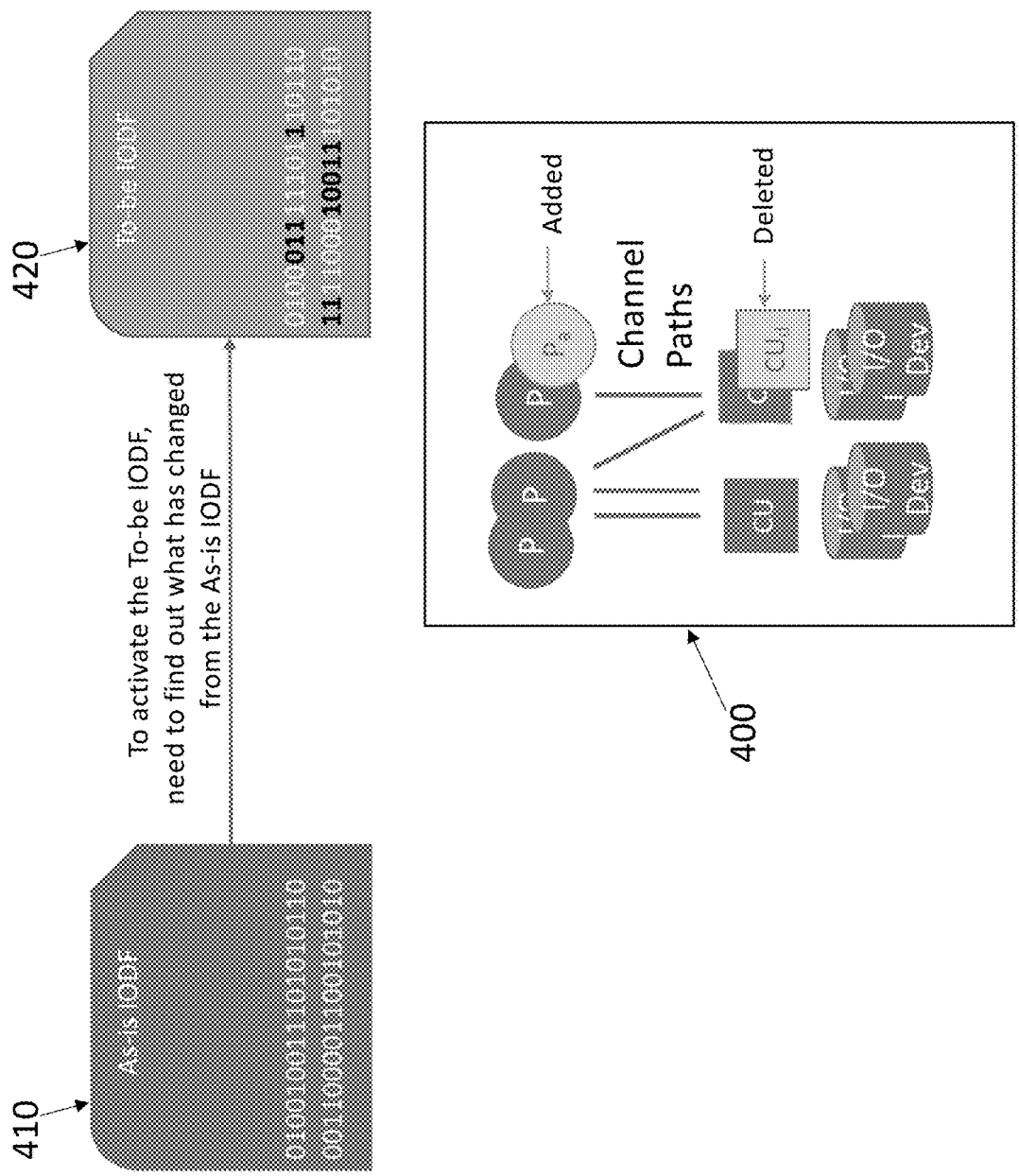
FIG. 4 depicts an as-is input/output definition file 410 and a to-be input/output definition file 420, in accordance with one or more aspects of the present invention.

When activating a desired (to-be) I/O configuration (e.g., a to-be IODF), the I/O elements defined therein need to be analyzed and compared with a baseline (as-is) I/O configuration (e.g., an as-is IODF) in order to identify changes. As an illustration, FIG. 4 depicts an as-is IODF 410 and a to-be IODF 420. The as-is IODF 410 may define the computing environment 300 of FIG. 3 and the to-be IODF 420 may define changes (represented by the bolded black binary text) to the computing environment 300 of FIG. 3. The changes defined by to-be IODF 420 are logically depicted by computing environment 400 and include the addition of a partition ($P_a$) and the deletion of a control unit ($CU_d$). However, before to-be IODF 420 can be sent for activation, it must be compared with as-is IODF 410 so that changes (i.e., addition of $P_a$ and deletion of $CU_d$) in the I/O configuration, depicted by computing environment 400, may be identified.

In one example, Hardware Configuration Definition product 200 is a panel-driven interface that facilitates definition of I/O elements of the computing environment and communicates with an interface, such as an HCD support element (SE) interface 202, which is executed on a support element 204. Support element 204 is, for instance, a notebook or server coupled to the central processor complex. It may be part of the central processor complex or separate therefrom. HCD support element interface 202 is, for instance, a command-line interface that communicates with a service, such as an activation service 210, executing on an internal firmware partition (e.g., processor firmware 114).

In one example embodiment, pruner module 203 may be a program, or subroutine contained in a program, that may compare two IODFs (e.g., an as-is IODF and a to-be IODF) side-by-side and selectively prune elements from one or more of the two IODFs thereby improving resource consumption and execution time within a computing environment. More specifically, pruner module 203, in an example embodiment, may create a hierarchal model of each IODF for easier comparison; process the IODFs iteratively without the need to keep the complete model for each IODF in memory; utilize a checksum mechanism for faster determination of differences between the two IODFs; and selectively prune, based on checksum values, portion(s) corresponding to I/O elements from one or more of the IODFs prior to sending them over an internal network of the computing environment to be activated. In an example embodiment, pruner module 203 is executed on a support element 204, communicates with Hardware Configuration Definition product 200 via HCD support element (SE) interface 202, and communicates with a service, such as an activation service 210, executing on an internal firmware partition (e.g., processor firmware 114). In another embodiment, pruner module 203 may be integrated within Hardware Configuration Definition product 200 and run on an operating system, such as operating system 116 (e.g., z/OS operating system). An example of the operations and functions of pruner module 203 are described in further detail below with regard to FIG. 5.

The activation service is used, in one embodiment, to at least initiate the requested I/O configuration changes (e.g., the configuration changes defined within a to-be IODF). For instance, in one example, the activation service makes calls (e.g., channel subsystem (CHSC) calls) to a channel subsystem (e.g., channel subsystem 150) to perform individual changes, such as define partitions, add/modify/delete channels, control units and/or I/O devices, as examples, and to store information relating to the I/O configuration changes in a hardware storage area 220. Although various I/O configuration changes are provided as examples, many other I/O configuration changes may be made without departing from aspects of the present invention.

In one embodiment, to change a system I/O configuration, a system administrator proceeds through a series of preparation steps. Thereafter, a dynamic hardware activate phase, during which I/O configurations (as-is and to-be) are sent over an internal network to be activated, is started and the system administrator waits for completion which currently could take several hours, even days, depending on resource constraints of the computing environment and aspects of the reconfiguration (e.g., amount of I/O changes, size of IODFs). Thus, in accordance with an aspect of the present invention, an advantageous approach to system I/O reconfiguration is presented which compares two I/O configurations (e.g., two IODFs) side-by-side, thereby reducing resource (e.g., CPU and memory) consumption and improving execution time (e.g., activation time) within a computing environment through selective pruning of elements within one or both of the I/O configurations prior to sending for activation, via a service such as activation service 210, and storage within, for example, hardware storage area 220.

An advantage of the present invention is that resources not used by internal processes of the computing environment relating to I/O reconfiguration are freed and made available for use. Another advantage of the present invention is reduced network traffic relating to I/O reconfiguration as a result of reduction in size of a requested I/O configuration (e.g., transmittal of smaller IODF files). Portions of I/O configurations determined to be equal through comparison may be transmitted over the network once or not at all. Another advantage of the present invention is reduced memory consumption within the computing environment as elements within the I/O configurations which are determined to be equal through comparison need not be stored within memory. Yet another advantage of the present invention is faster comparison of I/O configurations (e.g., comparison of to-be IODF and as-is IODF) as the comparison of corresponding sub-elements between the I/O configurations need not be performed if corresponding parent elements of the corresponding sub-elements between the I/O configurations are determined to be equal through comparison.

Although the system administrator is described herein as managing the configuration/reconfiguration, in other embodiments, it may be other administrators, users or even a computing system or component that is configured to determine reconfiguration changes, perform the preparation steps, schedule maintenance, etc.

Figure 5:
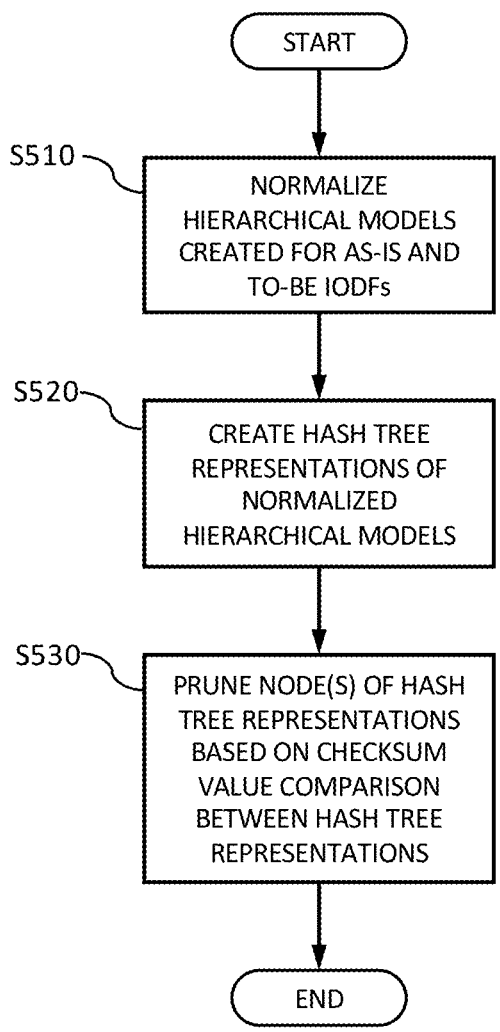
FIG. 5 is a flowchart illustrating the operations of the pruner module of FIG. 2, in accordance with one or more aspects of the present invention.

FIG. 5 shows a flowchart illustrating the operations of pruner module 203 in accordance with an example embodiment of the invention. In an example embodiment, one or more I/O configuration changes may be initiated by the system administrator, or automatically by a processor based on processing within the computing environment (e.g., computing environment 100). The one or more I/O configuration changes may be contained within a second I/O configuration, defined by a to-be IODF, proposed for activation over a first I/O configuration defined by an as-is IODF which defines the current configuration of the computing environment. Furthermore, in an example embodiment, both the as-is and the to-be IODFs for the computing environment may be defined using Hardware Configuration Definition product 200.

Referring to step S510, in an example embodiment, pruner module 203 normalizes hierarchical models created for the as-is and to-be IODFs. As part of this process, pruner module 203 creates a first hierarchical model based on the as-is IODF and a second hierarchical model based on the to-be IODF. Each IODF contains a description of the computing environment I/O configuration—the I/O elements defined therein and their relationships and attributes—and can span multiple systems and potential I/O configurations. As noted above, the internal structure of an IODF is similar to a relational database with tables and cross-references. To derive a hierarchical model, an IODF file may be transformed into a text-based JavaScript object notation (JSON) data structure, which is a hierarchically nested data structure comprising leaf nodes and non-leaf nodes that are representative of I/O elements within the computing environment I/O configuration defined by the IODF. Such a structure inherently captures the hierarchical nature of the I/O elements by hierarchically nesting the I/O elements of the IODF into leaf nodes and non-leaf nodes, with one or more cross-references between them. The transformation from IODF to hierarchical model is realized in a sequence of processing steps. First the IODF is parsed/read and all I/O elements contained therein, including their properties, which are relevant to the computing environment under study are collected in an order that processes the IODF iteratively. Then, the I/O elements are combined in a domain model defined by Java classes. Finally, the domain model is serialized into a JSON data structure.

As an illustration, FIG. 6 depicts a resulting JSON hierarchical model 600 derived from an IODF, for instance, the hierarchical model derived from the as-is IODF of the computing environment in the example embodiment. As is shown in callout 601, I/O elements (i.e., partitions, subchannel sets) of the resulting JSON hierarchical model 600 are hierarchically nested along with their properties. Although not shown, a JSON hierarchical model is similarly derived for the to-be IODF in the example embodiment. It should be noted that the JSON format is only one example data structure; other object notations/syntax (e.g., Extensible Markup Language (XML)) may be used to derive a hierarchical model.

Continuing with step S510, in an example embodiment, pruner module 203 normalizes hierarchical models created for the as-is IODF and the to-be IODF. The goal of the normalization step is to parse the various I/O elements contained within each hierarchical model representation of an IODF (e.g., the hierarchical models for the as-is IODF and the to-be IODF), and apply various syntactical transformation rules to them such that each hierarchical model still represents their respective I/O configurations, but are defined in a syntactically consistent manner across the two hierarchical models. Different types of I/O configuration elements may require one or more different kinds of transformation rules. The syntactical transformation rules are specific to each I/O element in the hardware configuration and may need to be applied in a specific order.

For example, the ordering of I/O configuration properties may need to be changed. An I/O configuration element might specify an "id" property followed by a "name" property, while an equivalent configuration could have specified the "name" first (followed by the "id"). Additionally, the value of a property might require a transformation. For example, a list of three partition ids which could be described by "1, 2, 3" or "2, 3, 1" (i.e., two syntactical representations but with the same semantics of three partitions). Grouping of sequential numbers might also be required as well since "1, 2, 3-8" would be equivalent to "1-8". In an example embodiment, normalization between the hierarchical models created for the as-is IODF and the to-be IODF is necessary for proper comparison below.

Figure 7:
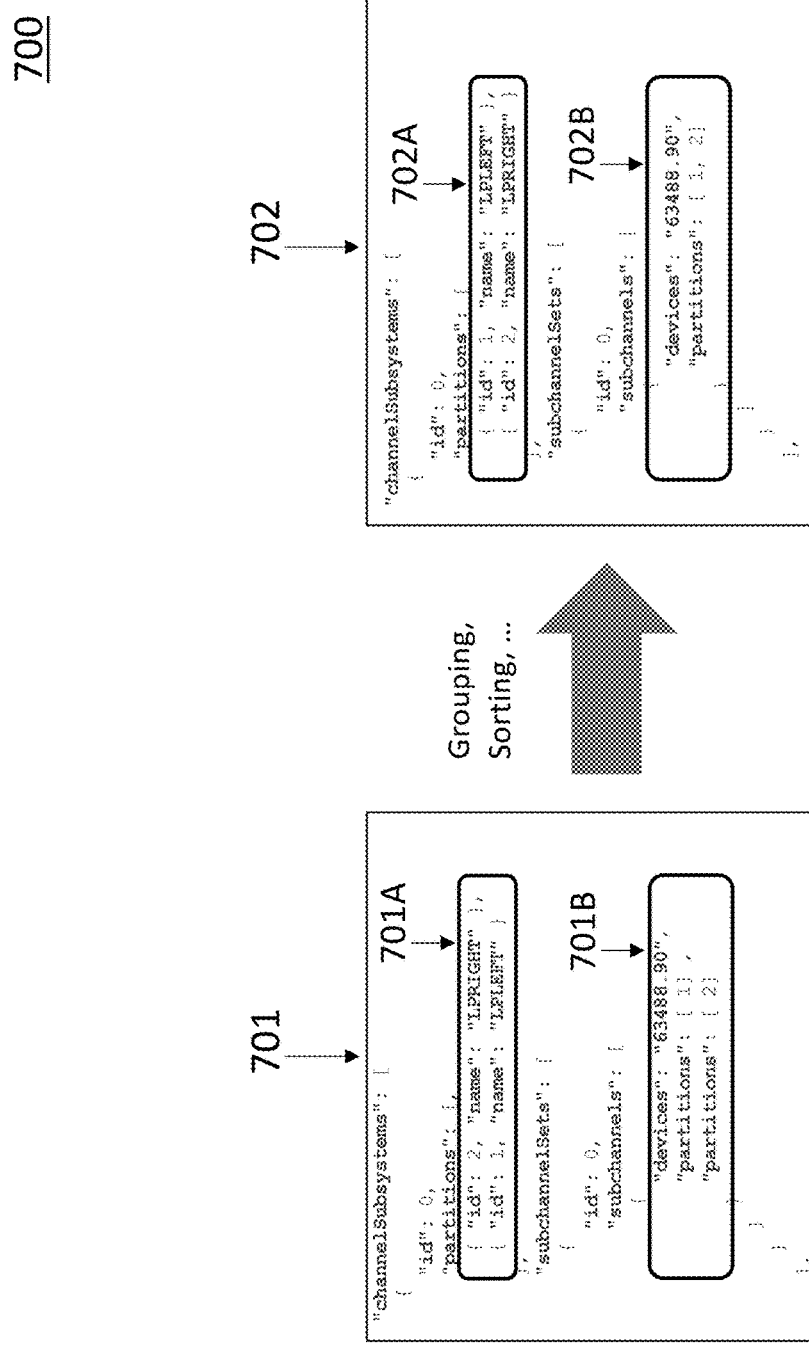
FIG. 7 depicts an example normalization 700 of a portion of an as-is input/output definition file, in accordance with one or more aspects of the present invention.

As an illustration, FIG. 7 depicts an example normalization 700 of a portion of the hierarchical model of the as-is IODF of FIG. 6. Partition properties and subchannel properties of pre-normalized hierarchical model of the as-is IODF 701 have been sorted and re-grouped resulting in normalized hierarchical model of the as-is IODF 702. Specifically, partition properties 701A have been sorted to list partition ids in numerically increasing order, resulting in normalized partition properties 702A. Additionally, subchannel properties 701B have been grouped to combine separately listed partitions, resulting in normalized subchannel properties 702B. Although not shown, the normalized hierarchical model for the to-be IODF in the example embodiment would reflect a similar fashion of sorting and regrouping of partition properties and subchannel properties.

Figure 8:
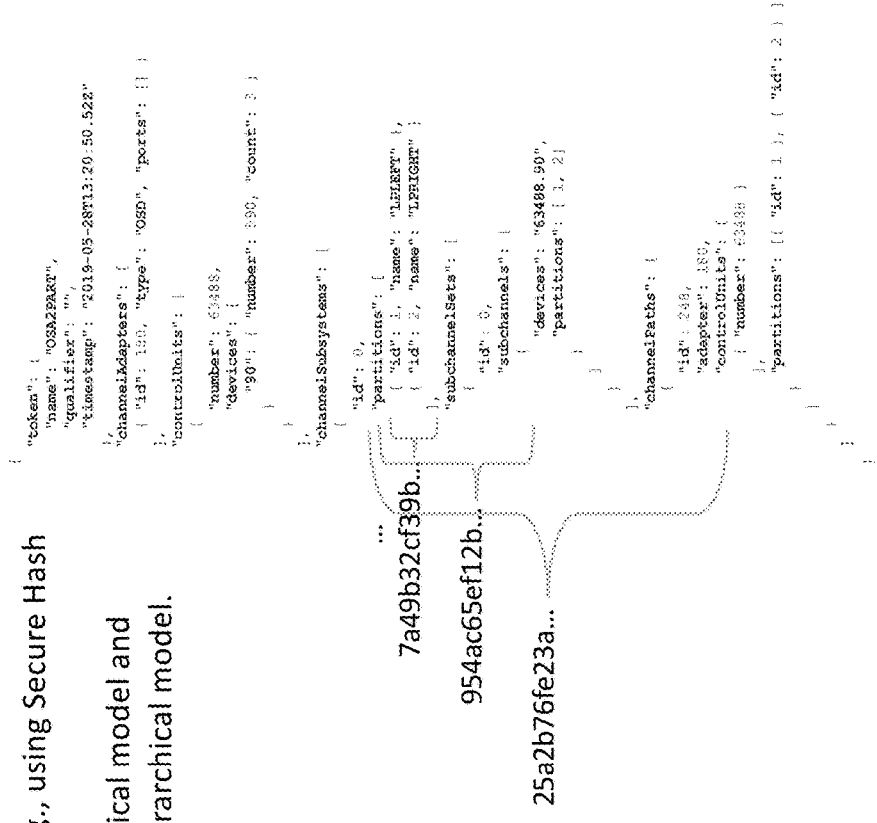
FIG. 8 depicts a portion 800 of the checksum values calculated for the normalized hierarchical model of the as-is input/output definition file of FIG. 7, in accordance with one or more aspects of the present invention.

Referring to step S520, in an example embodiment, pruner module 203 creates a first hash tree representation for the normalized hierarchical model of the as-is IODF and a second hash tree representation for the normalized hierarchical model of the to-be IODF. As part of this process, pruner module 203 calculates, for the normalized hierarchical models of the as-is IODF and the to-be IODF, checksum values for every leaf node based on leaf information and for every non-leaf node based on information of the node and its children. The checksum values are calculated according to the hierarchical structure of the JSON data structure. More specifically, in an example I/O configuration having a JSON hierarchical model with one root element and two child elements, checksum values are calculated for all individual nodes (i.e., the root and children nodes). Moreover, since the root element is itself a subtree, the checksum value for the root including the children is calculated. As an illustration, FIG. 8 depicts a portion 800 of the checksum values calculated, for example using Secure Hash Algorithm (SHA)-3, for leaf and non-leaf nodes of the normalized hierarchical model of the as-is IODF. Although not shown, checksum values for the normalized hierarchical model of the to-be IODF in the example embodiment are also calculated.

Figure 9:
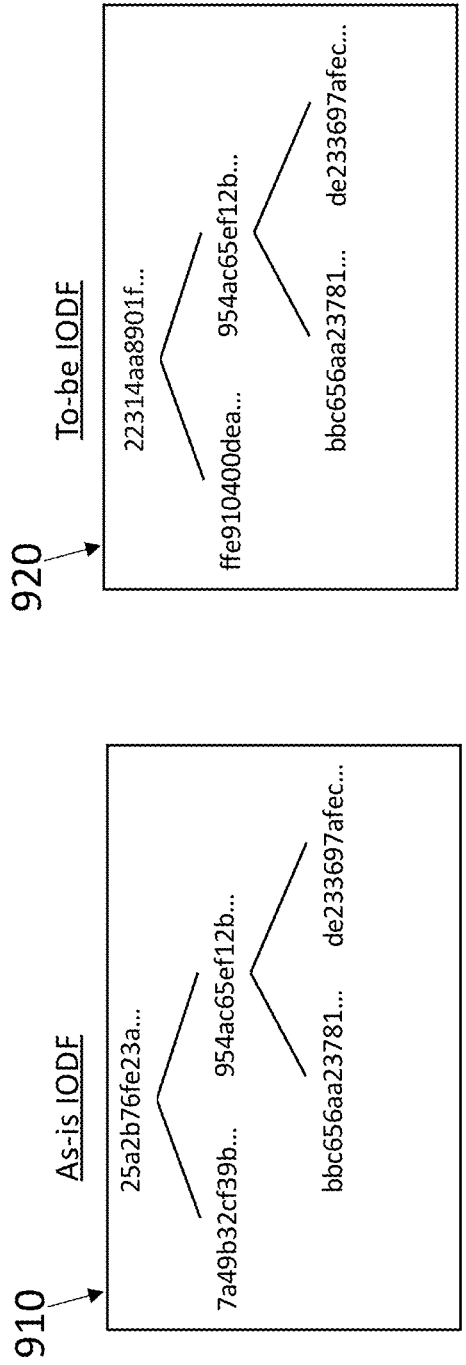
FIG. 9 depicts portions of hash tree representations of normalized input/output definition files, in accordance with one or more aspects of the present invention.

Continuing with step S520, in response to the checksum value calculations for leaf and non-leaf nodes described above, a first hash tree representation for the normalized hierarchical model of the as-is IODF and a second hash tree representation for the normalized hierarchical model of the to-be IODF are created. Nodes of the created hash tree representations will be the checksum values calculated for their respective hierarchical models and will reflect the logical hierarchical dependency of their respective hierarchical models (e.g., leaf nodes and non-leaf nodes). Furthermore, each hash tree representation at the root contains the checksum value to the subtree, for comparison to similar subtrees, and has a reference to its individual checksum value as well as references to the checksum values of the child nodes. As an illustration, FIG. 9 depicts a portion of a hash tree representation of the normalized as-is IODF 910 and a portion of a hash tree representation of the normalized to-be IODF 920. The hash tree representations 910 and 920 may be created for, and based on, the normalized as-is and normalized to-be IODFs, respectively, of the example embodiment.

In alternate embodiment, once checksum values for an I/O configuration represented by a normalized hierarchical model have been calculated, the checksumed I/O configuration may be persisted (or cached) within system memory so that in future comparisons against the same I/O configuration, that I/O configuration will not have to go through the normalization and checksum calculation processing again.

Referring to step S530, in an example embodiment, pruner module 203 prunes (i.e., deletes) one or more nodes of the first hash tree representation for the normalized hierarchical model of the as-is IODF and the second hash tree representation for the normalized hierarchical model of the to-be IODF based on checksum value comparison between the first hash tree representation and the second hash tree representation. As part of this process, pruner module 203 compares the calculated checksum values of the hash tree representation for the normalized hierarchical model of the as-is IODF with the calculated checksum values of the hash tree representation of the normalized hierarchical model of the to-be IODF. The hash tree representations of the normalized as-is and to-be IODFs allow for quick comparison of their respective configuration data, as comparison of the hash trees can be traversed hierarchically and can stop at the highest level of matching checksum values.

Figure 10:
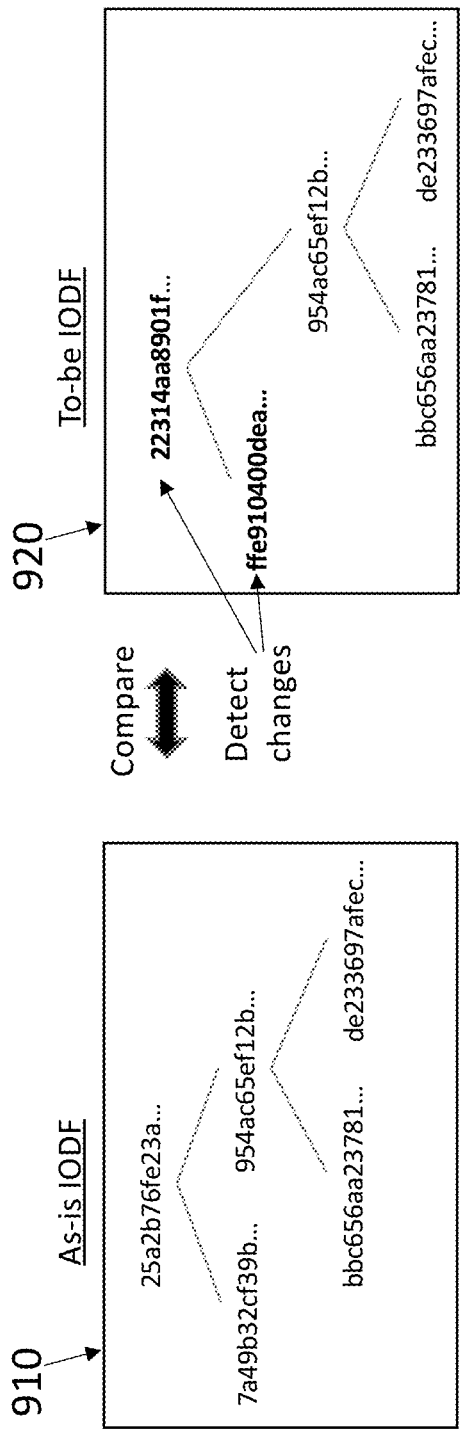
FIG. 10 depicts the comparison, and the detection of changes, between portions of the hash tree representations of the normalized input/output definition files of FIG. 9, in accordance with one or more aspects of the present invention.

As an illustration, FIG. 10 depicts the comparison, and the detection of changes, between portions of the hash tree representations of the normalized as-is IODF 910 and the normalized to-be IODF 920 of the example embodiment. As shown in FIG. 10, the value of the node with the checksum value of "25a2b7fe23a . . . " in the hash tree representation of the normalized as-is IODF 910 has changed to "22314aa8901f . . . " in the hash tree representation of the normalized to-be IODF 920. Also, the value of the node with the checksum value of "7a49b32cf39b . . . " in the hash tree representation of the normalized as-is IODF 910 has changed to "ffe910400dea . . . " in the hash tree representation of the normalized to-be IODF 920. Pruner module 203 may limit the comparison to non-equal nodes. For example, according to an aspect of the present invention, comparison of the hash trees depicted in FIG. 10 may stop at the non-leaf node with the checksum value of "954ac65ef12b . . . " as this non-leaf node, and its respective leaf nodes, have the same checksum values in both the hash tree representation of the normalized as-is IODF 910 and the hash tree representation of the normalized to-be IODF 920.

Continuing with step S530, pruner module 203, in an example embodiment, prunes (i.e., deletes) one or more nodes of the hash tree representations based on the checksum value comparison described above. More specifically, pruner module 203 may delete hash tree information in both hash tree representations where the checksum values are equal up to a root node of the hash tree representations, otherwise pruner module 203 may delete hash tree information in one hash tree representation only (e.g., the hash tree representation of the normalized hierarchical model of the to-be IODF). The as-is IODF and the to-be IODF may be updated to reflect deletions made in their respective hash tree representations of their respective normalized hierarchical models. Moreover, pruner module 203 may send the updated to-be IODF for activation via a service such as activation service 210. The updated as-is IODF, and/or the original as-if IODF, may also be sent with the updated to-be IODF in order provide context for the changes defined by the to-be IODF. In an example embodiment, pruner module 203 prunes one or nodes within at least one hash tree presentation (e.g., the hash tree representation of the to-be IODF) where the checksum value of a node(s) is the same between the hash tree representations of the normalized as-is IODF and the normalized to-be IODF. According to an aspect of the present invention, not only may the comparison between the hash tree representation of the as-is IODF and the hash tree representation of the to-be IODF stop where corresponding nodes of the hash trees have matching checksum values, but additionally, the I/O configuration data (e.g., I/O element) represented by the matching checksum value need not be kept in system memory as a matching checksum value between the hash tree representations signifies that the to-be IODF does not differ from the as-is IODF with regard to the I/O configuration data represented by the matching checksum value.

Figure 11:
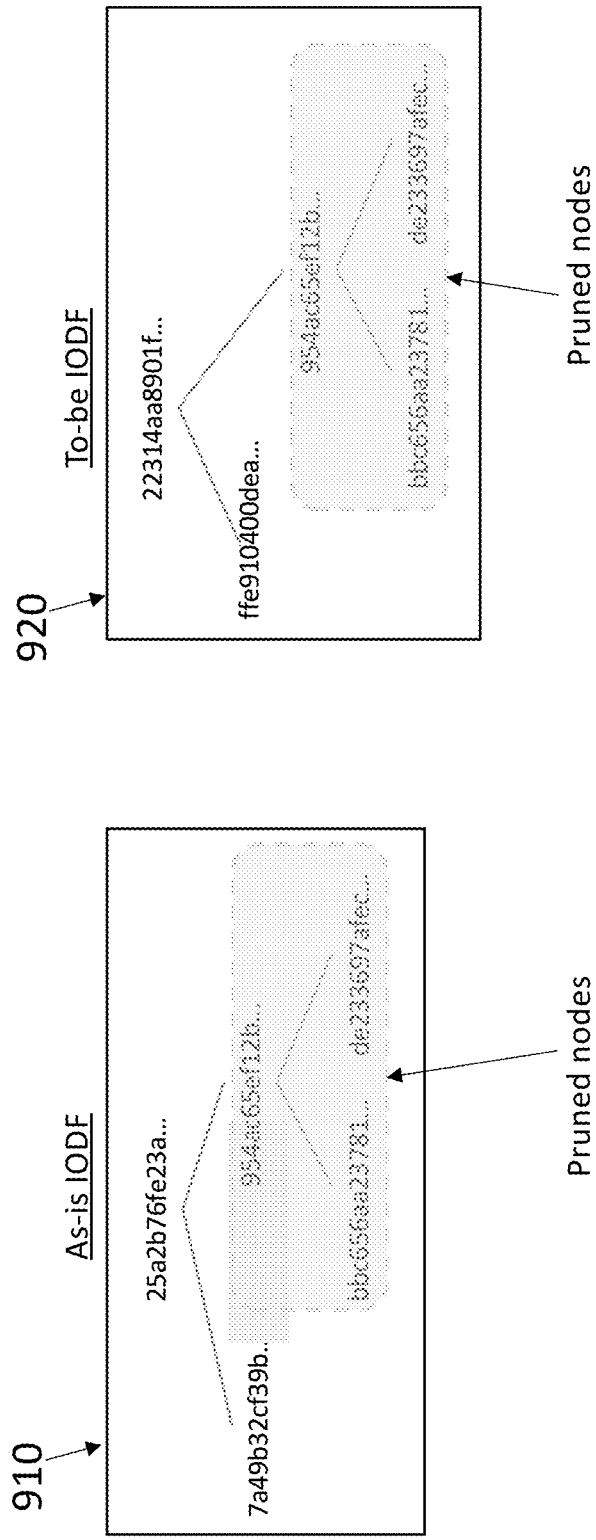
FIG. 11 depicts pruned nodes of the hash tree representations of FIG. 9, in accordance with one or more aspects of the present invention.

As an illustration, FIG. 11 depicts pruned nodes of the hash tree representation of the as-is IODF 910 and the hash tree representation of the to-be IODF 920 of the example embodiment. As shown in FIG. 11, nodes of the respective hash trees having the same checksum values are pruned (i.e., deleted) while nodes of the respective hash tress having different checksum values are kept. According to an aspect of the present invention, pruner module 203 may only prune both hash tree representations of the as-is IODF 910 and the to-be IODF 920 provided there is an equal individual checksum value (e.g., hash value) up to a root (i.e., parent) node. Otherwise, only one hash tree representation may be pruned due to bidirectional parent and child dependency. For example, in FIG. 11 the parent node having the checksum value of "954ac65ef12b . . . " is pruned, along with their respective child nodes, in both the as-is and to-be IODF. In an example embodiment, once a to-be IODF has been compared and pruned according to the operations of pruner module 203 described with regard to FIG. 5, the to-be IODF may then be sent for activation via an activation service such as an activation service 210.

Figure 12:
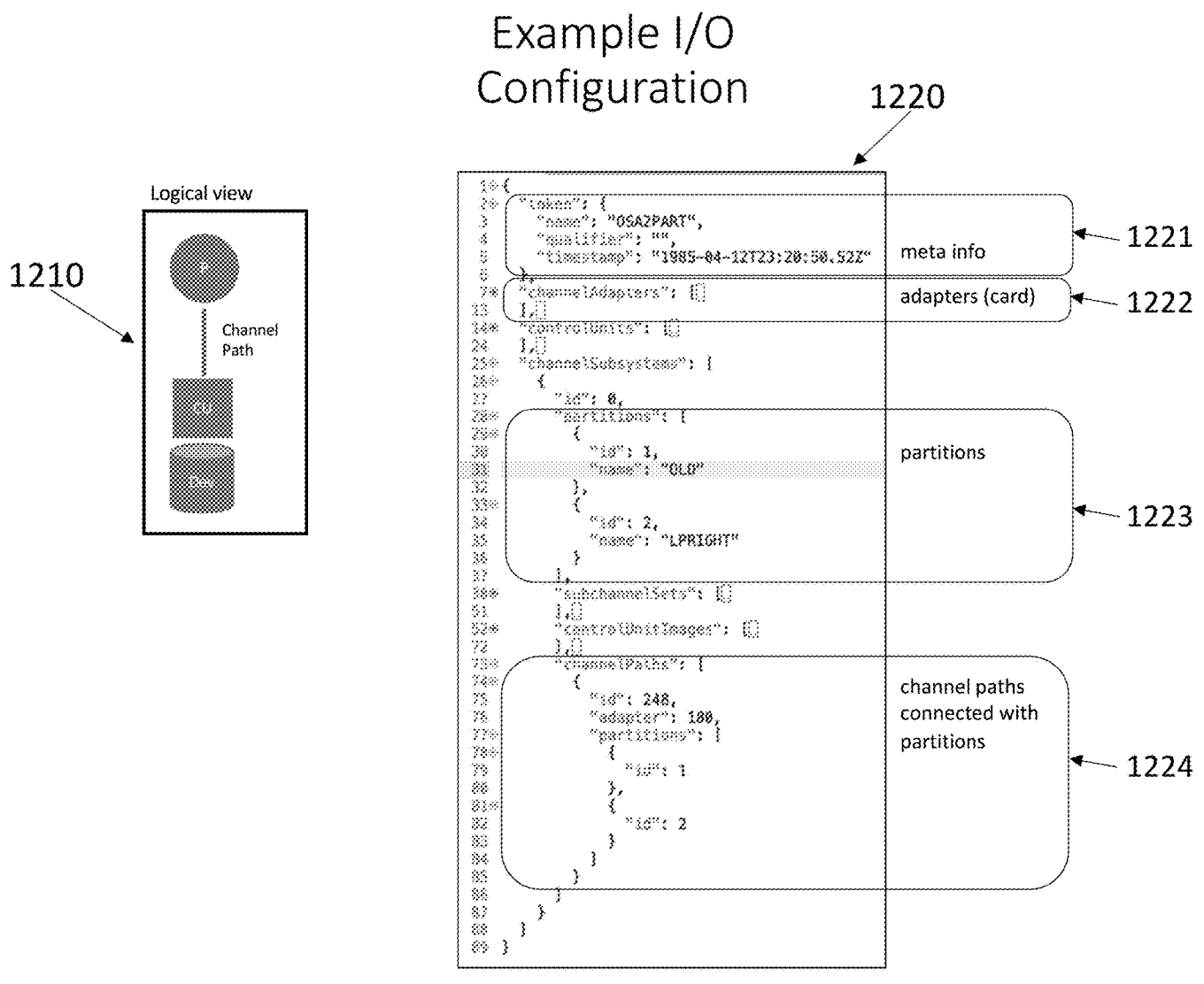
Figure 13:
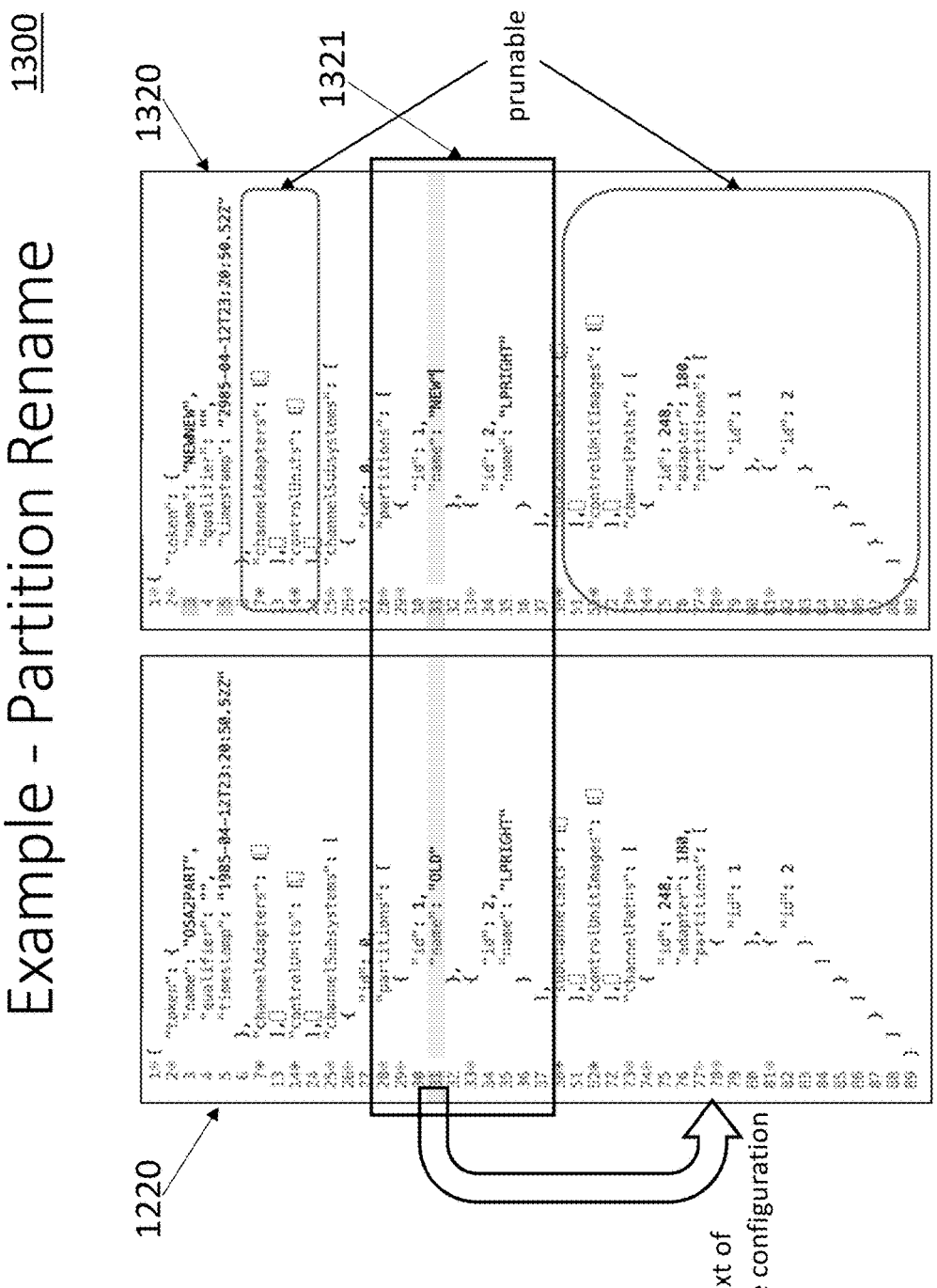
FIG. 13 depicts an example partition rename scenario 1300, in accordance with an aspect of the present invention.
Figure 14:
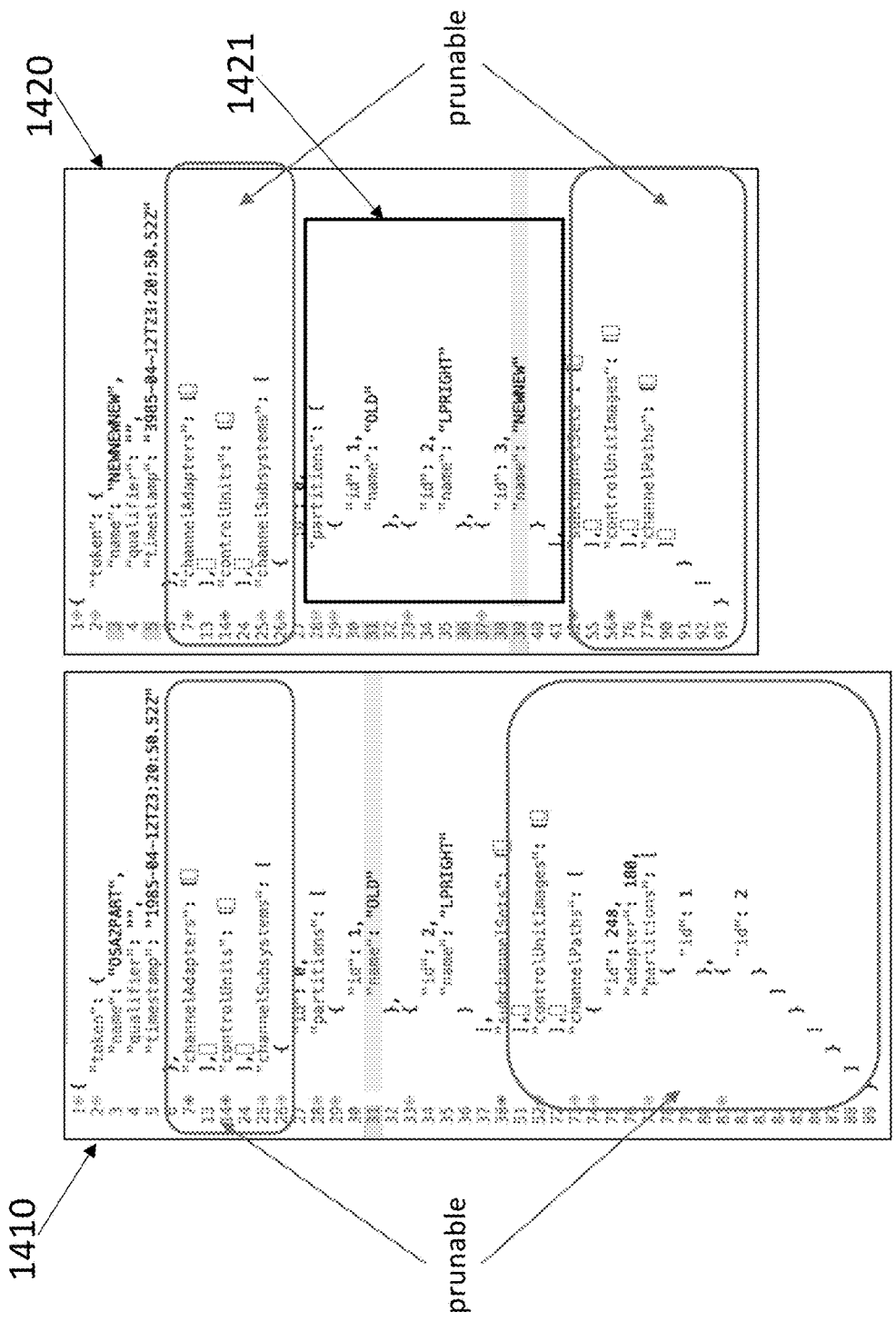
FIG. 14 depicts an example partition add scenario 1400, in accordance with an aspect of the present invention.
Figure 15:
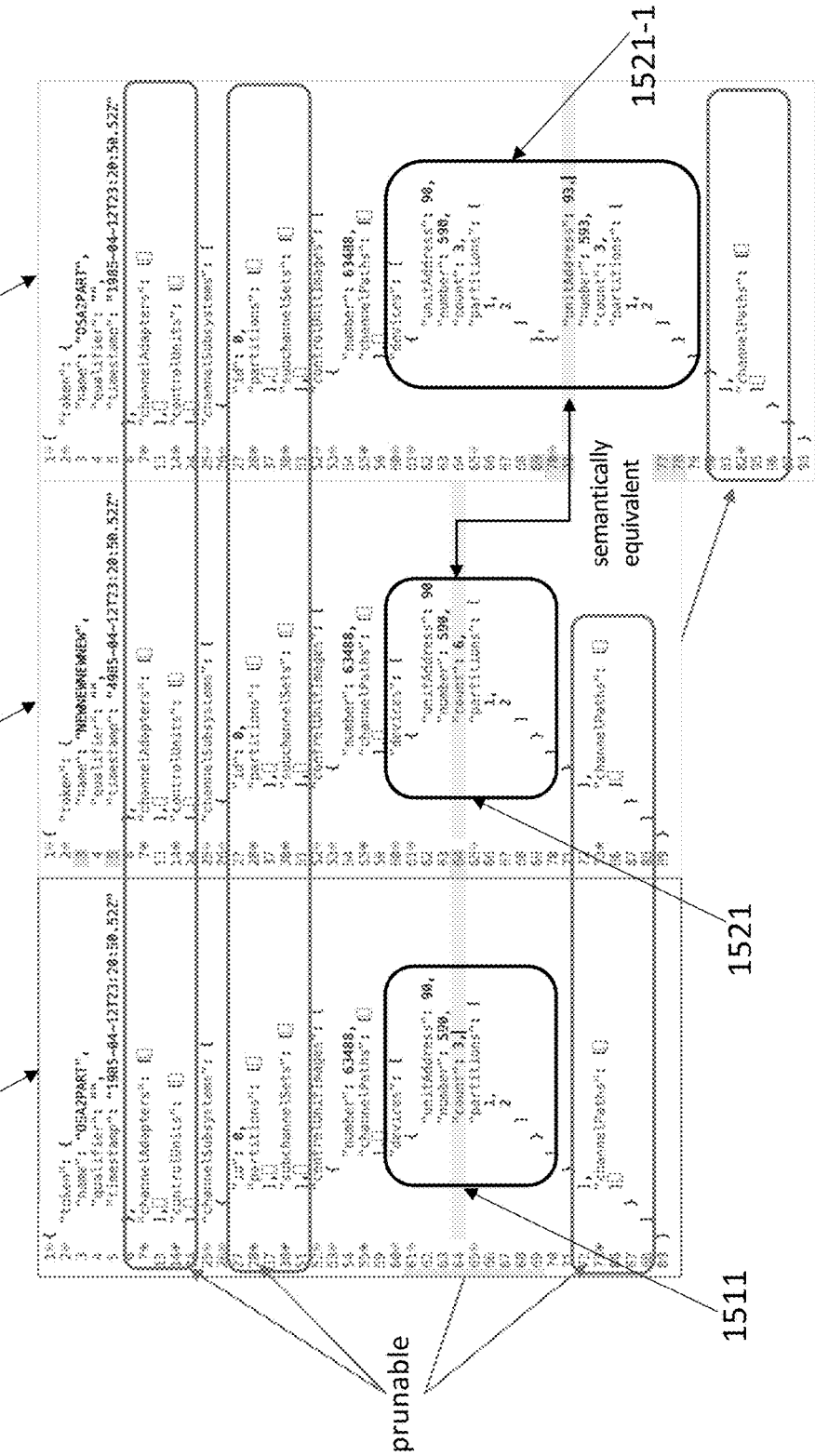
FIG. 15 depicts an example device add scenario 1500, in accordance with an aspect of the present invention.

FIGS. 12, 13, 14, and 15 depict illustrative scenarios in accordance with aspects of the present invention. Referring to FIG. 12, a logical view 1210 of an example I/O configuration along with a corresponding JSON hierarchical model 1220 of the example I/O configuration is shown. Portions of the JSON hierarchical model include meta info 1221, adapters 1222, partitions 1223, and channel paths connected with partitions 1224. Referring to FIG. 13, an example partition rename scenario 1300 is illustrated. The JSON hierarchical model shown on the left is the JSON hierarchical model 1220 from FIG. 12 and represents an as-is IODF. The JSON hierarchical model 1320 shown on the right represents a to-be IODF with a changed name attribute for a partition. Section 1321 contains the changes between JSON hierarchical model 1220 and JSON hierarchical model 1320. Specifically, the partition with the name attribute of "OLD" within JSON hierarchical model 1220 has been renamed to a name attribute of "NEW" within JSON hierarchical model 1320. Furthermore, as is shown in FIG. 13, portions of the to-be IODF 1320 are prunable by pruner module 203 as they do not reflect any changes from the as-is IODF 1220 on the left (i.e., checksum values of hash tree representations for these portions would be the same). In this example scenario, the portions of the as-is IODF 1220 which are the same as corresponding portions of the to-be IODF 1320 are not pruned so as to provide context for the changes reflected in the to-be IODF 1320. Referring to FIG. 14, an example partition add scenario 1400 to an I/O configuration is shown. An as-is JSON hierarchical model 1410 of the I/O configuration is depicted on the left and a to-be JSON hierarchical model 1420 of the I/O configuration is depicted on the right. Section 1421 reflects the difference between the as-is JSON hierarchical model 1410 and the to-be JSON hierarchical model 1420, specifically, the addition of the partition with the attributes "id":3 and "name": "NEWNEW". Portions of the as-is and to-be IODFs which are prunable by pruner module 203 are also identified. Referring to FIG. 15, an example device add scenario 1500 to an I/O configuration is shown. An as-is JSON hierarchical model 1510 of the I/O configuration is depicted on the left, a to-be JSON hierarchical model 1520 of the I/O configuration is depicted in the middle which reflects the addition of a second device. Specifically, within section 1521 of the to-be JSON hierarchical model 1520, the devices count property has increased to 6 (from 3 in the corresponding section 1511 of the as-is JSON hierarchical model 1510) to account for the added second device. Additionally, another to-be JSON hierarchical model 1520-1 is depicted on the right which is semantically equivalent to 1520. JSON hierarchical model 1520-1 is depicted in order to illustrate how a JSON hierarchical model (e.g., to-be JSON hierarchical model 1520) can be expressed in a different, yet semantically equivalent, manner. For example, sections 1521 and 1521-1 of FIG. 15 are semantically equivalent in that they are describing the same two devices; however, the devices are grouped in section 1521 and separated in section 1521-1. Portions of 1510, 1520, and 1520-1 which are prunable by pruner module 203 are also identified.

One or more aspects of the present invention are inextricably tied to computer technology and facilitate processing within a computing environment. A capability is provided to improve the process and execution time of a system being reconfigured by detecting reconfigurations through comparison of two I/O configurations side-by-side and selectively pruning portions of at least one I/O configuration prior to activation. This improves system resource consumption and system performance.

Although various embodiments are described herein, many variations and other embodiments are possible without departing from a spirit of aspects of the present invention. It should be noted that, unless otherwise inconsistent, each aspect or feature described herein, and variants thereof, may be combinable with any other aspect or feature.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various embodiments are described above, these are only examples. For example, computing environments of other architectures can be used to incorporate and use one or more embodiments. Additionally, other components may be used and/or take advantage of one or more aspects of the present invention. Moreover, other types of reconfigurations may be performed. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method for reconfiguration of a computing environment from an as-is input/output (I/O) configuration to a to-be I/O configuration, the method comprising:

normalizing a first hierarchical model of the as-is I/O configuration and a second hierarchical model of the to-be I/O configuration, wherein the first and the second hierarchical models each comprise a hierarchical structure of leaf and non-leaf nodes, and wherein normalizing comprises the application of syntactical transformation rules to the first and the second hierarchical models such that their respective I/O configurations are defined in a syntactically consistent manner across the first and the second hierarchical models;

creating a first hash tree representation of the first hierarchical model and a second hash tree representation of the second hierarchical model, wherein nodes of the first hash tree representation are checksum values calculated for leaf and non-leaf nodes of the first hierarchical model, and wherein nodes of the second hash tree representation are checksum values calculated for leaf and non-leaf nodes of the second hierarchical model, and wherein nodes of the first and second hash tree representations reflect the hierarchical structure of the first and the second hierarchical models, respectively; and pruning one or more nodes of the first hash tree representation and the second hash tree representation where checksum values are equal up to a root node of the first hash tree representation and a root node of the second hash tree representation.

2. The method of claim 1, wherein the as-is I/O configuration is defined by an as-is input/output definition file (IODF), and wherein the to-be I/O configuration is defined by a to-be IODF, and wherein the as-is IODF and the to-be IODF comprise a binary data structure similar to a relational database with tables and cross-references.

3. The method of claim 2, wherein the first hierarchical model and the second hierarchical model are based on the as-is IODF and the to-be IODF, respectively, and wherein a hierarchical model is a text-based JavaScript object notation (JSON) data structure comprising hierarchically nested leaf nodes and non-leaf nodes with one or more cross-references between them, and wherein the leaf nodes and non-leaf nodes are representative of I/O elements of an IODF, and wherein deriving the hierarchical model comprises:

iteratively parsing the IODF to collect the I/O elements contained therein, including their properties;
combining the I/O elements in a domain model defined by Java classes; and
serializing the domain model into a JSON data structure.

4. The method of claim 2, further comprising:
sending the to-be IODF for activation via an activation service.

5. The method of claim 1, wherein leaf and non-leaf nodes of the first hierarchical model are representative of I/O elements within the as-is I/O configuration, and wherein leaf and non-leaf nodes of the second hierarchical model are representative of I/O elements within the to-be I/O configuration, and wherein the syntactical transformation rules are specific to each I/O element within an I/O configuration and may need to be applied in a specific order.

6. The method of claim 1, further comprising:
pruning one or more nodes of the second hash tree representation where checksum values are the same between the first hash tree representation and the second hash tree representation.

7. The method of claim 1, further comprising:
persisting the first hash tree representation of the first hierarchical model and the second hash tree representation of the second hierarchical model within a memory of the computing environment.

8. A computer program product for reconfiguration of a computing environment from an as-is input/output (I/O) configuration to a to-be I/O configuration, the computer program product comprising:

one or more computer-readable tangible storage devices and program instructions stored on at least one of the one or more computer-readable tangible storage devices, wherein the program instructions are executable by a computer, the program instructions comprising:

program instructions to normalize a first hierarchical model of the as-is I/O configuration and a second hierarchical model of the to-be I/O configuration, wherein the first and the second hierarchical models each comprise a hierarchical structure of leaf and non-leaf nodes, and wherein normalizing comprises the application of syntactical transformation rules to the first and the second hierarchical models such that their respective I/O configurations are defined in a syntactically consistent manner across the first and the second hierarchical models;

program instructions to create a first hash tree representation of the first hierarchical model and a second hash tree representation of the second hierarchical model, wherein nodes of the first hash tree representation are checksum values calculated for leaf and non-leaf nodes of the first hierarchical model, and wherein nodes of the second hash tree representation are checksum values calculated for leaf and non-leaf nodes of the second hierarchical model, and wherein nodes of the first and second hash tree representations reflect the hierarchical structure of the first and the second hierarchical models, respectively; and program instructions to prune one or more nodes of the first hash tree representation and the second hash tree representation where checksum values are equal up to a root node of the first hash tree representation and a root node of the second hash tree representation.

9. The computer program product of claim 8, wherein the as-is I/O configuration is defined by an as-is input/output definition file (IODF), and wherein the to-be I/O configuration is defined by a to-be IODF, and wherein the as-is IODF and the to-be IODF comprise a binary data structure similar to a relational database with tables and cross-references.

10. The computer program product of claim 9, wherein the first hierarchical model and the second hierarchical model are based on the as-is IODF and the to-be IODF, respectively, and wherein a hierarchical model is a text-based JavaScript object notation (JSON) data structure comprising hierarchically nested leaf nodes and non-leaf nodes with one or more cross-references between them, and wherein the leaf nodes and non-leaf nodes are representative of I/O elements of an IODF, and wherein program instructions for deriving the hierarchical model comprise:

program instructions to iteratively parse the IODF to collect the I/O elements contained therein, including their properties;
program instructions to combine the I/O elements in a domain model defined by Java classes; and
program instructions to serialize the domain model into a JSON data structure.

11. The computer program product of claim 9, further comprising:
program instructions to send the to-be IODF for activation via an activation service.

12. The computer program product of claim 8, wherein leaf and non-leaf nodes of the first hierarchical model are representative of I/O elements within the as-is I/O configuration, and wherein leaf and non-leaf nodes of the second hierarchical model are representative of I/O elements within the to-be I/O configuration, and wherein the syntactical transformation rules are specific to each I/O element within an I/O configuration and may need to be applied in a specific order.

13. The computer program product of claim 8, further comprising:
program instructions to prune one or more nodes of the second hash tree representation where checksum values are the same between the first hash tree representation and the second hash tree representation.

14. The computer program product of claim 8, further comprising:
program instructions to persist the first hash tree representation of the first hierarchical model and the second hash tree representation of the second hierarchical model within a memory of the computing environment.

15. A computer system for reconfiguration of a computing environment from an as-is input/output (I/O) configuration to a to-be I/O configuration, the computer system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
program instructions to normalize a first hierarchical model of the as-is I/O configuration and a second hierarchical model of the to-be I/O configuration, wherein the first and the second hierarchical models each comprise a hierarchical structure of leaf and non-leaf nodes, and wherein normalizing comprises the application of syntactical transformation rules to the first and the second hierarchical models such that their respective I/O configurations are defined in a syntactically consistent manner across the first and the second hierarchical models;
program instructions to create a first hash tree representation of the first hierarchical model and a second hash tree representation of the second hierarchical model, wherein nodes of the first hash tree representation are checksum values calculated for leaf and non-leaf nodes of the first hierarchical model, and wherein nodes of the second hash tree representation are checksum values calculated for leaf and non-leaf nodes of the second hierarchical model, and wherein nodes of the first and second hash tree representations reflect the hierarchical structure of the first and the second hierarchical models, respectively; and
program instructions to prune one or more nodes of the first hash tree representation and the second hash tree representation where checksum values are equal up to a root node of the first hash tree representation and a root node of the second hash tree representation.

16. The computer system of claim 15, wherein the as-is I/O configuration is defined by an as-is input/output definition file (IODF), and wherein the to-be I/O configuration is defined by a to-be IODF, and wherein the as-is IODF and the to-be IODF comprise a binary data structure similar to a relational database with tables and cross-references.

17. The computer system of claim 16, wherein the first hierarchical model and the second hierarchical model are based on the as-is IODF and the to-be IODF, respectively, and wherein a hierarchical model is a text-based JavaScript object notation (JSON) data structure comprising hierarchically nested leaf nodes and non-leaf nodes with one or more cross-references between them, and wherein the leaf nodes and non-leaf nodes are representative of I/O elements of an IODF, and wherein program instructions for deriving the hierarchical model comprise:
program instructions to iteratively parse the IODF to collect the I/O elements contained therein, including their properties;
program instructions to combine the I/O elements in a domain model defined by Java classes; and
program instructions to serialize the domain model into a JSON data structure.

18. The computer system of claim 16, further comprising:
program instructions to send the to-be IODF for activation via an activation service.

19. The computer system of claim 15, wherein leaf and non-leaf nodes of the first hierarchical model are representative of I/O elements within the as-is I/O configuration, and wherein leaf and non-leaf nodes of the second hierarchical model are representative of I/O elements within the to-be I/O configuration, and wherein the syntactical transformation rules are specific to each I/O element within an I/O configuration and may need to be applied in a specific order.

20. The computer system of claim 15, further comprising:
program instructions to prune one or more nodes of the second hash tree representation where checksum values are the same between the first hash tree representation and the second hash tree representation.

* * * * *